United States Patent

Morris et al.

[11] 4,203,173
[45] May 20, 1980

[54] OVERFLOW INHIBITOR FOR PLUMBING FIXTURES

[75] Inventors: Earl L. Morris, Whittier; Walter V. Hafner, Industry; Theodore J. Sally, Whittier, all of Calif.

[73] Assignee: Acorn Engineering Co., Industry, Calif.

[21] Appl. No.: 38,451

[22] Filed: May 14, 1979

[51] Int. Cl.² .................... E03D 11/02; E03D 11/18
[52] U.S. Cl. ........................................ 4/427; 4/302; 4/DIG. 3; 4/DIG. 15; 4/406; 137/392; 137/624.12
[58] Field of Search .................... 4/427, 302, DIG. 3, 4/DIG. 15, 249, 313, 304, 305, 301, 308, 406, 404, 407, 328, 312, 317, 172.17, 1; 137/606, 392, 624.12; 251/131

[56] References Cited

U.S. PATENT DOCUMENTS

| | | | |
|---|---|---|---|
| 2,707,482 | 5/1955 | Carter | 4/DIG. 3 |
| 2,858,546 | 11/1958 | Tekenos et al. | 4/313 |
| 2,988,751 | 6/1961 | Rutherford | 4/427 |
| 3,121,880 | 2/1964 | Gelhar | 4/249 |
| 3,713,177 | 1/1973 | Tuffs et al. | 4/320 |
| 3,751,736 | 8/1973 | Egli | 4/305 |
| 3,908,204 | 9/1975 | Hopkins | 4/406 |
| 3,928,874 | 12/1975 | Albertson | 4/1 |
| 3,987,502 | 10/1976 | Hartman | 4/427 |
| 4,041,557 | 8/1977 | Ringler | 4/427 |

Primary Examiner—Henry K. Artis
Attorney, Agent, or Firm—Ben E. Lofstedt

[57] ABSTRACT

A plumbing fixture in combination with means for preventing overflow from a toilet bowl having a P-trap when an obstruction is created in the waste outlet thereof, such plumbing fixture including a blow-out jet pipe, the entrance of the pipe being coupled in fluid communication with the water supply pipe connected to the toilet bowl at the upper portion thereof and the outlet of the pipe coupled in fluid communication with the P-trap of the toilet bowl of the plumbing fixture, comprising: a toilet bowl having a water supply pipe operably coupled therewith; an electrically-controlled flushing valve operably associated with the supply pipe for controlling the flow of water to the toilet bowl; a source of electricity for operating the valve; electrical switch means operably associated with the source of electricity for controlling the delivery of electricity for controlling the delivery of electricity to the valve for actuation thereof; an insulated electrical probe mounted in the water supply pipe; said electrical probe operably associated with a detection circuit means whereby said detection circuit deactivates said source of electricity when water is in said supply pipe and completes the circuit between said electrical probe and electrical ground.

8 Claims, 2 Drawing Figures

OVERFLOW INHIBITOR FOR PLUMBING FIXTURES

BACKGROUND OF THE INVENTION

1. Field of the Invention

The present invention relates to plumbing fixtures for penal institutions, and the like, and, more particularly, to plumbing fixtures incorporating means for preventing overflow from the toilet bowl, flooding and subsequent damages caused typically by an obstruction of the waste outlet of the toilet bowl.

2. Description of the Prior Art

Penal institutions, and the like, provide cells for the inmates thereof, such cells typically being equipped with a single, combination plumbing fixture which includes a lavatory and a toilet bowl or water closet. Preferably, such a combination unit is wall-mounted to allow the unit to be securely anchored to the wall to prevent removal thereof from the side of the plumbing fixture which is exposed to the cell area and the inmate thereof. Additionally, a wall-mounted unit usually permits servicing and maintenance of the unit, when necessary, from the opposite side of the wall not accessible from the cell area, thereby, eliminating the need for authorized service personnel to enter the cell area holding the inmates. Such an arrangement improves the basic overall security of the penal institution.

The lavatory usually consists of a fixed bowl or basin with a pushbutton-activated, time-delayed close faucet providing running water thereinto, with a drain pipe for draining of the water-based effluent therefrom following use by the inmate or inmates. The toilet bowl of the combination plumbing fixture consists typically of a water flushed bowl with a toilet seat which is utilized for inmate urination and defecation.

A major problem of providing such a plumbing fixture for inmate convenience is that inmates will attempt to cause damage to the institutional facilities by causing either, or both, of the lavatory or toilet bowl, to overflow their rims thereof and to flood the institutional facilities. This is frequently accomplished by obstructing the waste outlet of the toilet bowl or drain pipe of the lavatory, or both, by stuffing clothes, or other objects, into the waste outlet or drain pipe, and adjusting the water flow control valves for continuous flow, or repeatedly flushing, as the case might be; the object being to admit into the basin or toilet bowl a greater volume of water than can be drained out of the wate outlet or drain pipe. The end result is a flooding condition in the cell area, and of the institutional facilities adjacently disposed thereto. This flooding can cause a substantial amount of property damage, especially, as is frequently the case, if the cells are located on an upper floor of a building housing offices, storage files, or other functional installations therebeneath.

The prior art abounds with numerous attempts to electrically control the fluid levels in toilet bowls and water closets. I am aware of the following prior art patent references which electrically and electronically control water closets and urinals: U.S. Pat. Nos.:

| | | | | |
|---|---|---|---|---|
| 1,985,314 | 2,707,482 | 3,034,151 | 3,329,974 | 3,751,736 |
| 2,552,625 | 2,858,546 | 3,066,314 | 3,334,359 | 3,908,204 |
| 2,603,794 | 2,908,017 | 3,115,643 | 3,339,212 | 3,928,874 |
| 2,612,901 | 2,988,751 | 3,121,880 | 3,593,346 | 3,987,502 |
| 2,635,691 | 3,024,469 | 3,314,081 | 3,713,177 | 4,041,557 |

However, the following U.S. Patents bearing numbers: 3,928,874; 3,987,502; and 4,041,557 have been examined and are believed to be of pertinent interest with respect to the invention presently disclosed herein.

U.S. Pat. No. 3,928,874 discloses a mechanism for preventing the overflow of flushing fluid from a toilet bowl when the fluid level in the toilet bowl reaches a pre-determined level; a fluid level which is determined to be abnormal or dangerously close to overflowing the rim of the toilet bowl. Basically, this device comprises two functional parts. First, an electric switch mounted in the toilet bowl which is activated by a flushing fluid level in the toilet bowl which has been previously determined to represent an abnormal or dangerous level, and, second, an electrically operated flushing fluid control valve operably coupled to the switch which is rendered inoperable when the switch is activated.

However, the key to this device is the specific fluid level sensing system, its arrangement and its location used to activate the electric switch. Such switches are generally identified by 28 in FIGS. 1-6, inclusive, of the Drawings. The switch configurations illustrated in FIGS. 1, 2 and 4 are undesirable for use because they can be rendered inoperative when clogged with solid waste, such as toilet paper and fecal matter. Such clogging can easily occur when toilet paper, solid fecal matter, or both, come into contact with the float 30 of FIG. 2 and float 44 of FIG. 4, and stick thereto. Such sticking of either material adds to the weight of the floats 30 and 44, thereby changing their buoyancy characteristics and rendering them, at best, unpredicatable or, at worst, inoperative to the point of permitting an overflow.

Further, the toilet paper, fecal matter, or both, could easily become wedged inbetween the wall of the toilet bowl 16 and the float 30, thereby, preventing the float 30 from being buoyed upwardly to activate the switch 28 to terminate the flow of flushing fluid into the toilet bowl 16 and preventing an overflow. The very same thing could readily occur with respect to the float configuration 44 of FIG. 4 with the same results.

While the switch configuration disclosed in FIG. 5 eliminates these disadvantages and undesirable features, it, along with the switch configurations of FIGS. 1, 2 and 4, are readily subject to inmate vandalism which is usually rampant and unpredictable in penal institutions and the like. For example, the floats 30 and 44 could be easily jammed and rendered inoperative by an inmate deliberately wedging something inbetween the float and the wall of the toilet bowl 16. With respect to the pressure switch mechanism 48 of FIG. 5, the inmate could easily cut, tear, or rip the fabric of the diaphragm 56, thereby, rendering it inoperative and non-functional.

With respect to the arrangement disclosed in FIG. 6, while the placement of the pressure switch 48 renders it inaccessible to the inmate, it is undesirable due to the fact that should a blockage occur in the downwardly inclined or hooked portion 26 of the drain line 22 of the toilet bowl 16, the flushing system could be flushed to fill the toilet bowl 16 above the blockage and re-flushed to produce as many overflows as desired. Normally, the only time that flushing fluid is delivered into the upper portion 24 of the drain line 22 is during the flushing cycle; otherwise, no water or pressure head exists as implied by the inventor thereof in column 2, lines 50-56, inclusive. The same holds true for the pressure switch 60 arrangement illustrated in FIG. 7.

U.S. Pat. No. 3,987,502 teaches, in combination, a plumbing fixture 10 including a means for preventing overflow when an obstruction occurs in the waste pipe 34 of the water closet or toilet 16, including a water flushed bowl 30, or in the drain pipe 22 of the bowl or basin 18 of the lavatory 14. Such is accomplished by inserting an electric sensing probe 50 positionally below the rims of the basin 18 and bowl 30 via the walls thereof, and, are electrically insulated from the walls, so that when the flushing fluid, which is electrically conductive, contacts the sensing probes 50, the probes 50 are electrically shorted to the electrically-conductive walls of the basin 18 and bowl 30, thereby activating a normally open solenoid-controlled valve 26 or 38, as the case might be, each mounted in the water supply lines for the basin 18 and the bowl 30, turning off the supply of water to prevent overflow of either the basin 18 or the bowl 30.

FIGS. 3A and 3B clearly disclose the position of the sensing probe (mislabeled as 62) within the flushing rim 52 (referred to an an overflow chamber 54).

Such an arrangement is unacceptable for use in a penal institution because it can be easily rendered inoperable by an inmate by merely spraying an electrically insulating coating or paint or coating it with Vaseline petroleum jelly, or the like, through the outlet passageways disposed below the inwardly turned portion 80 of the rim 52, thereby preventing the probe 50 from being activated to prevent overflow. Consequently, because such a system can be easily rendered inoperable by an inmate, it is not vandalproof, and, hence, is unacceptable for use in a penal institution or like institutional environment.

Perhaps, U.S. Pat. No. 4,041,557 is related most nearly of all of the prior art known to the inventor. This patent discloses an electrical toilet flushing mechanism useful in prisons and similar institutions which the inventor declares: ". . . cannot be made to overflow by repeated flushing, even if the toilet is clogged." This patent employs an electrical sensing probe, identified as an insulated electrode 47, similar to probe 50 of the mechanism of U.S. Pat. No. 3,987,502. However, in this case, the insulated ". . . electrode 47 is located in the toilet bowl flushing fluid supply pipe 15 back from the rim of the toilet bowl so that it is impossible for an inmate to disconnect the electrode or to defeat the action in any way." (Column 2, lines 54-57, inclusive.).

While the device disclosed in U.S. Pat. No. 4,041,557 eliminates the vandal problem encounted, with the mechanism of U.S. Pat. No. 3,987,502, overflow can occur under both anticipated and normal blockage and obstruction conditions of the waste drain line 23. For example, consider the following obstruction situation. An obstruction or blockage is created at the bottom of the toilet bowl 5; however, this obstruction does not block the entrance to the waste line 23, nor the outlet of the blow-out line 21. If any water is standing in the toilet bowl 5 at a level sufficient to contact the electrode 47, it is bailed out so that the level is beneath the electrode 47 so that the electrode 47 will permit the flushing valve 11 to be actuated. Thereafterwards, the flushing valve 11 is actuated and flushing water rushes into the toilet bowl 5 adding a substantial amount of additional water to that already in the toilet bowl 5, and producing an overflow condition.

Further, even assuming that the water is not bailed out by hand from the toilet bowl 5 so that the water level will not contact the electrode 47, the water, in any event, will inherently drain out the blow-out line 21 into the waste line 23, thereby always placing the electrode 47 above the water level, thereby rendering the electrode 47 ineffective, in the toilet bowl 5 regardless of whether the outlet of the toilet bowl 5 is blocked to prevent drainage of the water and effluent from the toilet bowl 5. Consequently, the location of the electrode 47, and the corresponding electrical system as presented by the patentee of U.S. Pat. No. 4,041,557 will not overcome this problem, and the toilet bowl 5 will overflow under the condition as, a typical condition, indicated and described hereinabove.

SUMMARY OF THE INVENTION AND OBJECTS

Basically, the invention comprises, in combination, a plumbing fixture with a means for preventing overflow from a toilet bowl having a P-trap when a blockage is created in the waste outlet thereof, such fixture including a blow-out jet pipe, the entrance of the pipe being fluidly coupled with the water supply pipe at the upper portion thereof and the outlet of the pipe being fluidly coupled with the P-trap of the toilet bowl of the plumbing fixture, comprising: a toilet bowl having a water supply pipe operably coupled therewith; an electrically-controlled flushing valve operably associated with said supply pipe for controlling the flow of water to the toilet bowl; a source of electricity for operating said valve; electrical switch means operably associated with the source of electricity for controlling the delivery of electricity to the valve for actuation thereof; an insulated electrical probe mounted in said water supply pipe; said electrical probe operably associated with a detection circuit means whereby said detection circuit deactivates said source of electricity when water is in said supply pipe and completes the circuit between said electrical probe and electrical ground.

Accordingly, it is a primary and important object of the instant invention to provide a plumbing fixture which will prevent attempts by inmates to produce overflowing, and the subsequent damage occasioned thereby, to the penal institution.

Another important object of the present invention is to provide a plumbing fixture wherein all controls which control the overflow inhibiting function are disposed in such a fashion that such cannot be reached, defeated or damaged by an inmate from that portion of the plumbing fixture exposed to the cell area.

A still further and primary object of the invention is to provide an electrically controlled fluid flushing system for a toilet bowl wherein it cannot be repeatedly flushed to cause the water, waste fluids and solid waste matter to overflow the rim thereof.

A yet still further object of the instant invention is to provide an electrically controlled fluid flushing system for a toilet bowl wherein it cannot be flushed if the water level reaches a dangerously high level in the toilet bowl, such as near, or at, the toilet bowl rim.

It is a prime and important object of the present invention to provide a plumbing fixture of the type herein described with an electrically controlled fluid flushing system which cannot be flushed if the electrical supply fails.

It is yet a still further and primary object of the invention disclosed herein to provide an electrically powered, remote-indicating alarm system to indicate when a plumbing fxiture has reached a possible overflow condition and to rapidly identify which plumbing fixture it is.

Another primary and important object of the invention is to provide an overflow protection system for a water jet assisted toilet waste drain flushing system which will continue to prevent overflowing even in the event that the waste drain is blocked between the entrance to the blow-out pipe located in the waste drain pipe and the entrance to the waste drain pipe located at the bottom of the toilet bowl.

These objects, features and advantages of the invention herein, together with other objects and advantages which will become subsequently apparent reside in the details of construction and operation as more fully hereinafter described and claimed, reference being had to the accompanying drawings forming a part thereof, wherein like numerals refer to like elements throughout, and in which:

DESCRIPTION OF THE PREFERRED EMBODIMENT

Figure 1:
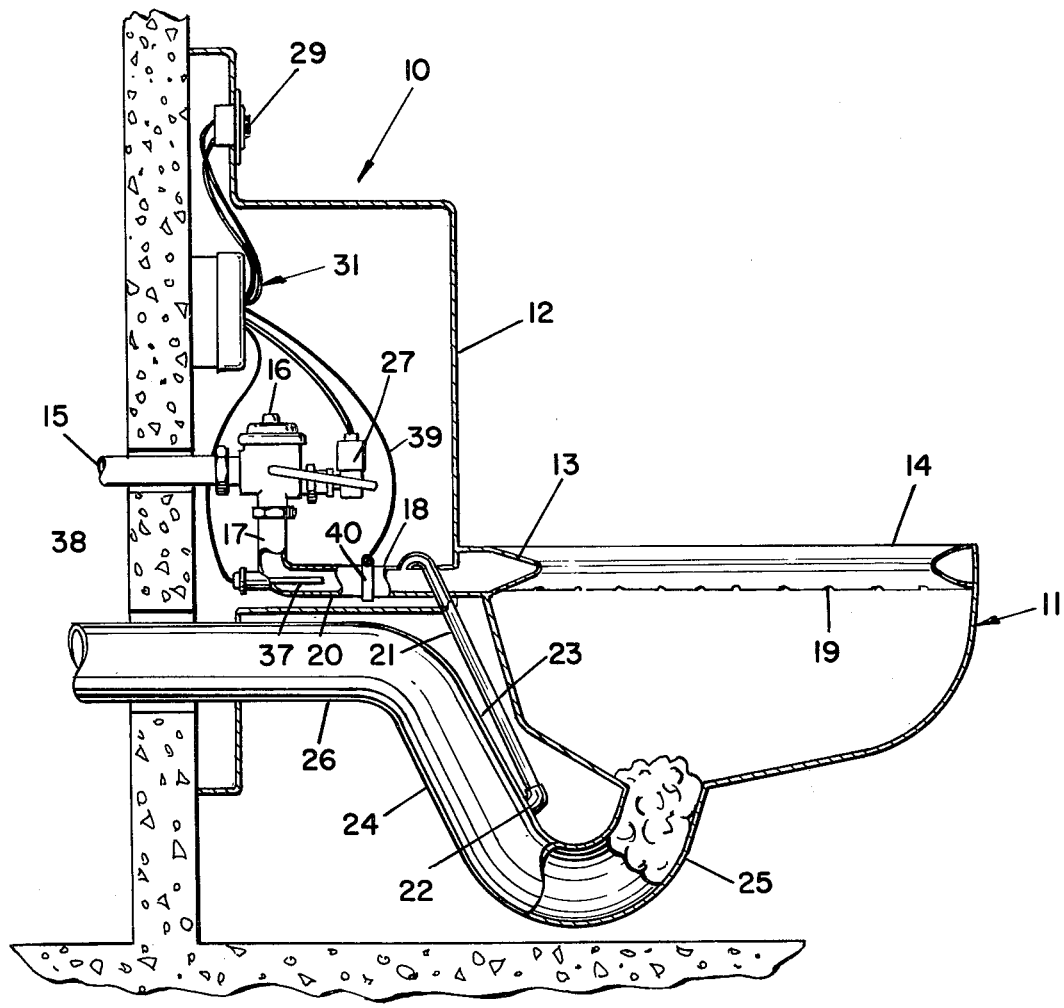
FIG. 1 is a side elevational view, partly in section, of a plumbing fixture having a toilet bowl, embodying the present invention.

With continued reference to the Drawings herein, and, with particular emphasis now on FIG. 1, there is shown the plumbing fixture 10 having an electrically-controlled flushing toilet bowl 11 mounted to the cabinet portion 12 thereof. The toilet bowl 11 comprises a flushing rim 13 with an integral seat 14 for humans thereon. The toilet bowl 11 is provided with a water supply 15 which is fluidly connected to a flushing valve 16. The flushing valve outlet 17 is fluidly coupled to the water flushing line 18, which, in turn, delivers the water to the flushing rim 13 of the toilet bowl 11. Thereafterwards, the water is distributed, in relatively uniform fashion, about the flushing rim 13 and discharged therefrom into the toilet bowl via the holes 19 distributed about the underside thereof. A portion of the water is directed into the entrance 20 of the blow-out jet pipe 21. The outlet 22 of the blow-out jet pipe 21 is fluidly coupled to the upper portion 23 of the P-trap 24 as it rises upwardly from its lower portion 25. Preferably, the blow-out jet pipe 21 is disposed between the P-trap 24 and the toilet bowl 11. In so doing, the length of pipe needed for the blow-out jet pipe 21 is substantially reduced. Syphon action is initiated by water flowing through the blow-out jet pipe 21 when a portion of the flushing water is passed therethrough. Effluent leaves the toilet bowl 11 through the waste line 26.

As taught and disclosed by the present invention, an electrical actuator 27 is provided for valve 16 in lieu of the more conventional mechanically-actuated pushbutton initiated flush valve control.

Figure 2:
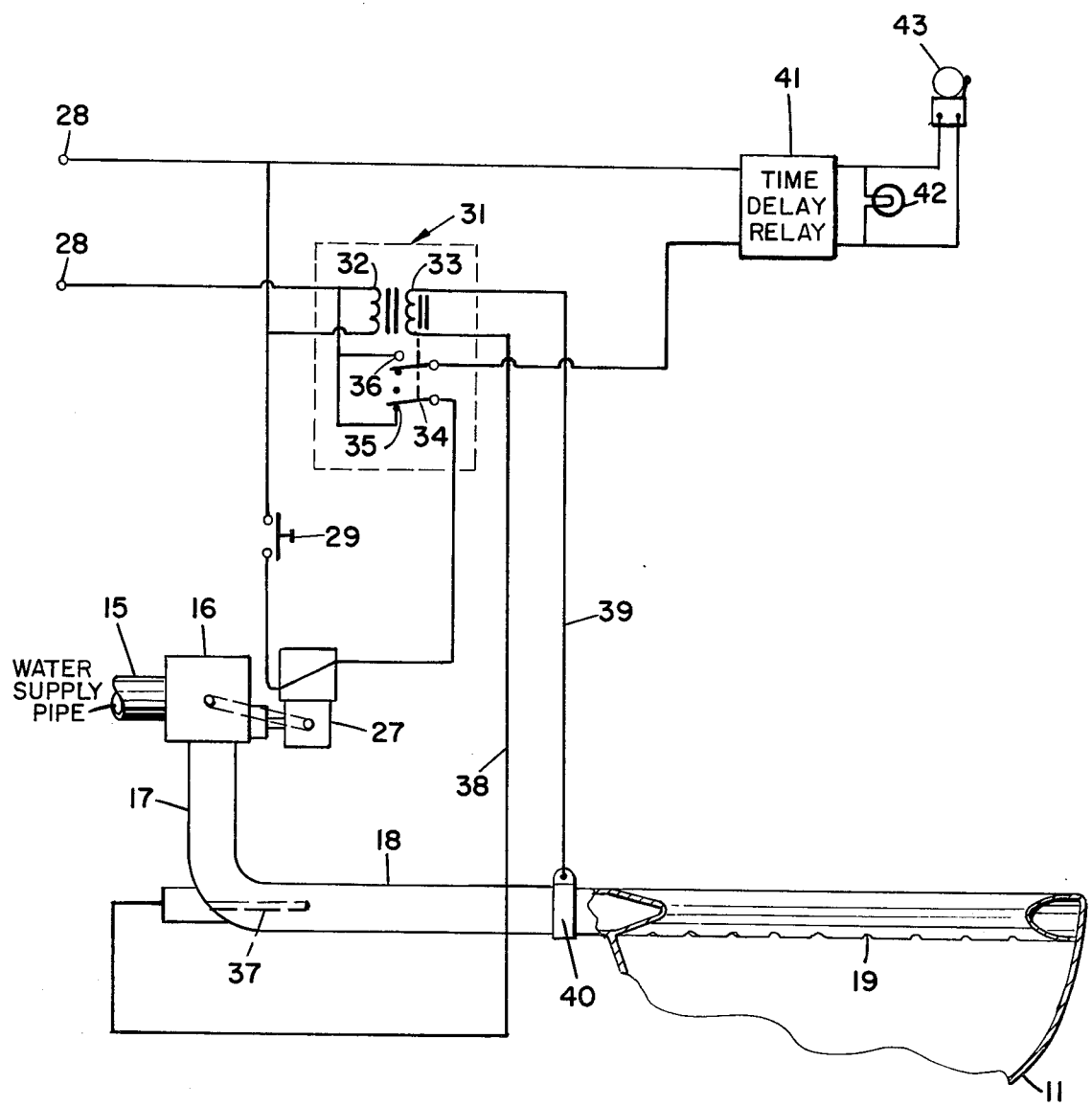
FIG. 2 is an electrical circuit diagram of the toilet overflow inhibiting circuit, the toilet flushing switching system, including the time delay, and an overflow indicator.

With reference now also to FIG. 2, it is seen that electrical current is provided to the actuator 27 via the electrical lines 28 operably coupled to the source of electricity through the pushbutton switch 29.

Additionally, the electrical lines 28 are operably connected to the primary coil 32 of the induction relay, generally designated herein by 31. The induction relay 31 is an electrical device well-known in the prior art. It consists of a dual-coil electrical device, referred to commonly as a "transformer". Such a device has a primary coil 32 and a secondary coil 33 with a metal core relay armature 34. A pair of mechanically-coupled electrical contacts 35, 36 complete the relay 31. Electrical current will flow in the secondary coil 33 only when the secondary coil's circuit is completed as hereinafter described. When electrical current does flow through the secondary coil 33, the relay 31 is actuated by energizing the armature 34 of the secondary coil 33 because it develops a magnetic field which attracts the mechanical arms of the electrical contacts 35, 36.

The contacts 35 of the relay 31 are normally closed, while the contacts 36 are normally open. Contacts 35 are in series arrangement with one of the two electrical supply lines 28 connected to actuator 27. One side of the secondary coil 33 is electrically connected to the insulated electrical probe 37 located in the water supply line 18 by means of wire 38. The other secondary coil 33 wire is effectively coupled to electrical ground through wire 39. As shown, this is conveniently accomplished by connecting it to the outside of the pipe 18 by a clamp 40.

OPERATION OF THE OVERFLOW INHIBITING CIRCUIT

The flush valve 16 is actuated by pushing the push button of switch 29. Since the contacts 35 are normally closed, current will flow through the actuator 27, thereby actuating the flush valve 16. Actuation of the valve 16 causes the flushing water to be delivered into pipe 18 and about the electrical probe 37. Flushing water, being electrically conductive, causes the circuit to be completed between the electrical probe 37 and electrical ground, here, the plumbing fixture via wire 39. Consequently, electrical current is caused to flow in the secondard coil 33, which electromagnetically pulls the contacts 35 open. As long as the water remains in the pipe 18, the contacts 35 remain open and it is impossible to again flush the toilet bowl since the actuator 27 cannot be actuated.

OPERATION WHEN TOILET BOWL DRAIN IS OBSTRUCTED

As depicted in FIG. 1, an obstruction such as might be caused by the inmates stuffing clothing or the like into the toilet bowl 11 in an attempt to overflow the toilet bowl rim 13 by repeatedly flushing the toilet, will cause the water to engulf the electrical probe 37, thereby, shorting it to ground which renders the electrical system inoperative and preventing further actuation of the flushing valve 16.

It should be noted that by coupling the entrance 20 of the blow-out jet pipe 21 to the upper portion of the water flushing line 18, the water standing in the toilet bowl 11 cannot drain out through the line 18 and the blow-out jet pipe 21 as will occur when the entrance 20 of the blow-out jet pipe 21 is coupled to the bottom portion of the line 18, as is the case, as previously discussed, in U.S. Pat. No. 4,041,557.

If the entrance 20 is coupled to the bottom portion of the line 18, which is the configuration disclosed in U.S. Pat. No. 4,041,557, the standing water will drain out below the electrical probe 37 and allow the flush valve 16 to be actuated again, even though the toilet bowl 11 is abnormally filled with water. Obviously, if flushed under such circumstances, water will overflow the toilet bowl 11 rim 13 and flood the institutional facilities.

MONITORING AND WARNING OF OVERFLOW CONDITION

Frequently, in an institutional environment, authorities are desirous of being alerted early of either the existence of flooding due to overflowing or of attempts to create flooding. To accomplish this task, the normally open contacts 36 of relay 31 are used by coupling a time-delay relay 41 in series arrangement with a line 28 of the source of electricity. Such can be used to turn a light 42 "on" or to sound an audible warning device 43, such as fixed frequency device, Mallory SONA-LERT ®, or a buzzer, or a bell.

Obviously, such items can be used as remotely located devices to signal an improper condition or activity orchastrated by the inmates of the institution. As an example, the light might be located in the office of one of the prison guards so that the proper authorities will be made instantly aware of the exact location of the cell being flooded or of attempted flooding. The time delay relay 41 should be chosen with a time delay longer than the time required for line 18 to drain during a normal flush cycle.

It should be noted at this time, that security is assured by placing all of the electrical apparatus within the cabinet 12 of the plumbing fixture 10, thereby, precluding access thereto by unauthorized personel, such as the inmates.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention as claimed.

What is claimed is:

1. A plumbing fixture with a toilet bowl, the toilet bowl having a P-trap coupled to the waste outlet thereof, including a toilet bowl overflow inhibiting means, comprising:
    (a) a toilet bowl having a water supply pipe operably coupled therewith;
    (b) an electrically-controlled flushing valve operably associated with said supply pipe for controlling the flow of water to the toilet bowl;
    (c) a source of electricity for operating said valve;
    (d) electrical switch means operably associated with the source of electricity for controlling the delivery of electricity to the valve for actuation thereof;
    (e) an insulated electrical probe mounted in said water supply pipe;
    (f) said electrical probe operably associated with a detection circuit means whereby said detection circuit disconnects said source of electricity when water is in said supply pipe and completes the circuit between said electrical probe and electrical ground;
    (g) a blow-out jet pipe having an entrance and an outlet thereto, the entrance thereto being coupled in fluid communication with said supply pipe at the upper portion thereof and the outlet being coupled in fluid communication with the P-trap of the toilet bowl at the uprising portion thereof; and
    (h) means within said blow-out jet pipe for preventing the draining of water from the toilet bowl into the water supply pipe and into the blow-out jet pipe.

2. The combination of claim 1, wherein said toilet bowl includes a flushing rim in integral combination with the seat.

3. The combination of claim 1 wherein the entrance to said blow-out jet pipe is fluidly coupled to the top of said water supply pipe.

4. The combination of claim 1 wherein said blow-out jet pipe is disposed between said P-trap and said toilet bowl.

5. The combination of claim 1 wherein said entrance to said blow-out jet pipe is fluidly coupled to said water supply pipe between said insulated electrical probe and the connection of said supply pipe and said toilet bowl.

6. The combination of claim 1 wherein said blow-out jet pipe entrance is fluidly coupled to said supply pipe above the lowest portion of said electrical probe.

7. The combination of claim 1 wherein said deactivating means includes an induction relay having primary and secondary coils wherein said primary coil is operably coupled to said source of electricity, and wherein said secondary coil is electrically connected in series arrangement with said electrical probe, said induction relay having normally closed contacts in series with said source of electricity which are disconnected when electrical current flows in said secondary coil.

8. The combination of claim 1 having in addition a time-delay relay, said time delay being greater than the normal flushing period of said toilet, said time-delay relay having means thereon to activate an indicator device.

* * * * *